June 19, 1962 N. J. BOUCHARD 3,039,249

TAPE WRAPPING MACHINES

Filed June 8, 1959 8 Sheets-Sheet 1

*INVENTOR.*

NORMAN J. BOUCHARD

*BY*

*Carpenter, Abbott, Coulter & Kinney*

*INVENTOR.*
NORMAN J. BOUCHARD
*BY*
Carpenter, Abbott, Coulter & Kinney

June 19, 1962 N. J. BOUCHARD 3,039,249

TAPE WRAPPING MACHINES

Filed June 8, 1959 8 Sheets-Sheet 3

INVENTOR.

NORMAN J. BOUCHARD

BY

Carpenter, Abbott, Coulter & Kinney

INVENTOR.
NORMAN J. BOUCHARD
BY
Carpenter, Abbott, Coulter & Kinney

INVENTOR.
NORMAN J. BOUCHARD
BY
Carpenter, Abbott, Coulter & Kinney

June 19, 1962 N. J. BOUCHARD 3,039,249

TAPE WRAPPING MACHINES

Filed June 8, 1959 8 Sheets-Sheet 6

*INVENTOR.*
NORMAN J. BOUCHARD
*BY*
Carpenter, Abbott, Coulter & Kinney

*INVENTOR.*
NORMAN J. BOUCHARD
*BY*
Carpenter, Abbott, Coulter & Kinney

*INVENTOR.*
NORMAN J. BOUCHARD
*BY*
Carpenter, Abbott, Coulter & Kinney 3,039,249

TAPE WRAPPING MACHINES

Norman J. Bouchard, East Longmeadow, Mass., assignor to Minnesota Mining and Manufacturing Company, St. Paul, Minn., a corporation of Delaware
Filed June 8, 1959, Ser. No. 818,682
5 Claims. (Cl. 53—198)

The present invention relates to machines for holding a roll of pressure-sensitive adhesive tape and for dispensing a length of tape from such roll to seal or mark, etc. an article, or to wrap a number of separate articles to form them into a wrapped bundle.

A machine of the type to which this invention relates contains a recess, into which the article or articles to be wrapped are placed against the adhesive coated surface, near the free end of a supply of tape, and a transporting shuttle which acts to withdraw tape from the supply and to apply it to the article or articles as the shuttle is moved across the recess, over the top of the article. The adhesive side of the transported tape adheres to the adhesive side of the free end of the tape, and is then severed, forming a flag type wrap around the article.

The embodiments of the invention, to be hereinafter particularly described, have been adapted for special utility in applying a wrap of pressure-sensitive adhesive tape about the neck of a bag. It will be apparent, however, as this description proceeds, that these machines may be used for other sealing, holding or marking purposes (e.g., placement of strips of tape about objects for purposes of identification, or to wrap a number of separate articles together, etc.) and that said machines can be adapted or modified for more varied usage, without departing from the inventive concept involved.

It has become common practice to pack articles of produce (such as vegetables, etc.) as well as many other articles and objects, in bags most frequently made from plastic, mesh fabric or paper. The packing of articles in such bags is often done by the commercial establishments which sell them to consumers, so a machine which will seal these bags with a great deal of speed and convenience is desirable. While other machines are available for such use, a machine of the present invention provides a new method of quickly and easily sealing these bags with tape, and, in the same movement, severing the tape to complete the wrapping operation.

A principal object of the present invention is to provide a machine whereby a tough, tenacious seal of pressure-sensitive adhesive tape may be quickly and securely applied about the neck of a bag, or other article. Other objects of the invention are to provide a machine which may be operated without previous training on the part of the operator, and which is small and inexpensive enough so that relatively large numbers of such machines may be used in any one commercial establishment.

Figure 1:
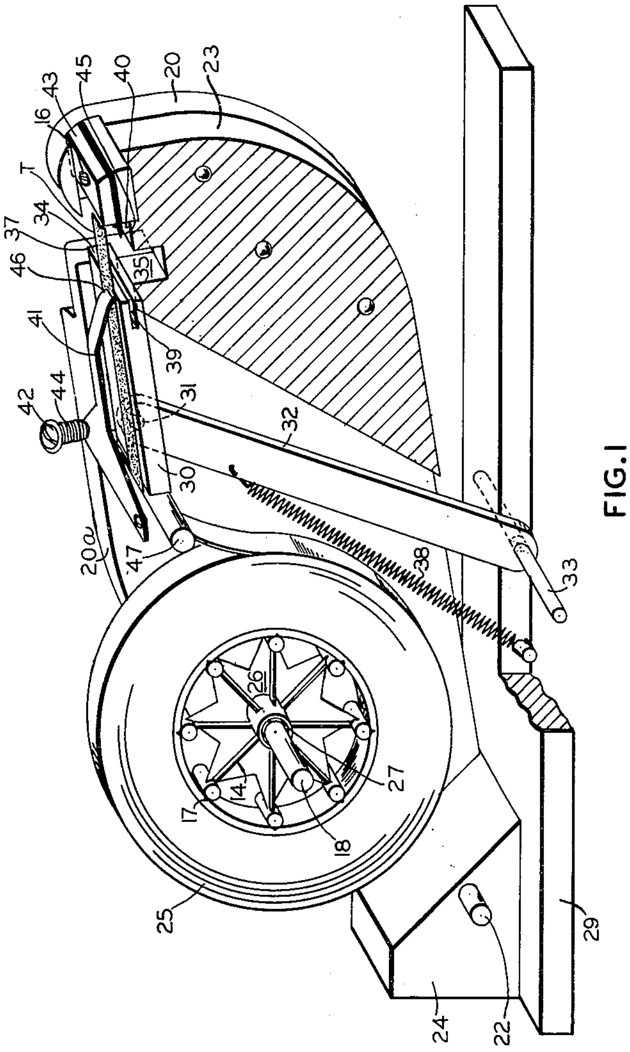

Other objects and advantages of the invention will be apparent from the following detailed description of illustrative embodiments shown in the accompanying drawings, in which drawings:

FIGURE 1 is a perspective view of a machine of this invention, with a roll of pressure-sensitive tape mounted therein, showing the machine in rest position, with one side of the machine removed, for purposes of clarity.

Figure 2:
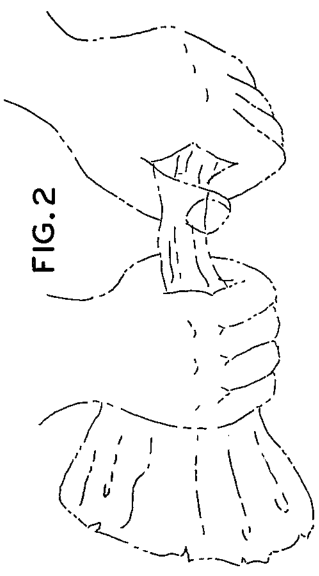
Figure 4:
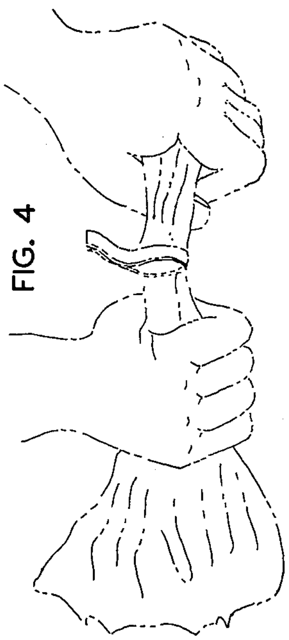
Figure 3:
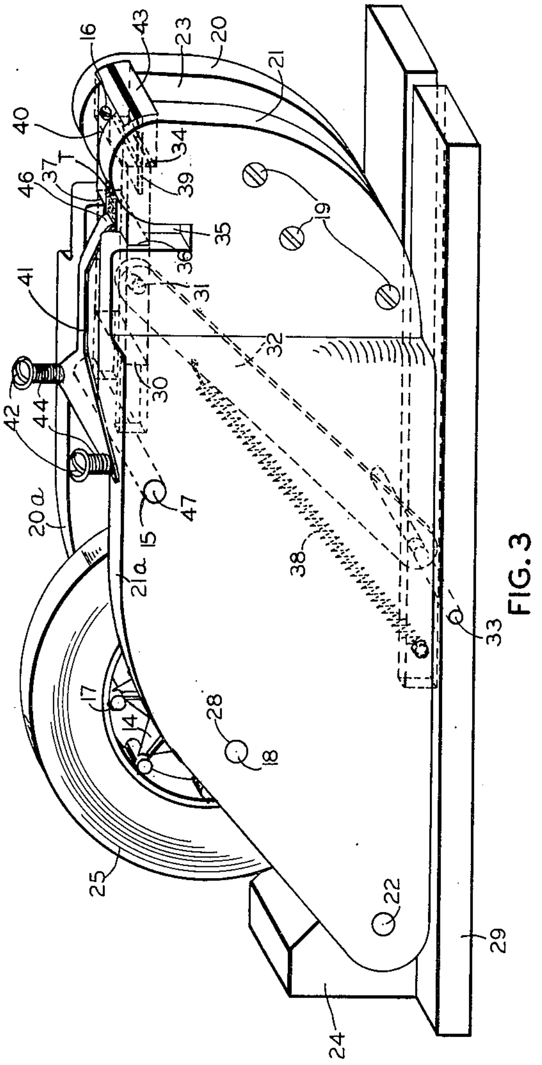
Figure 5:
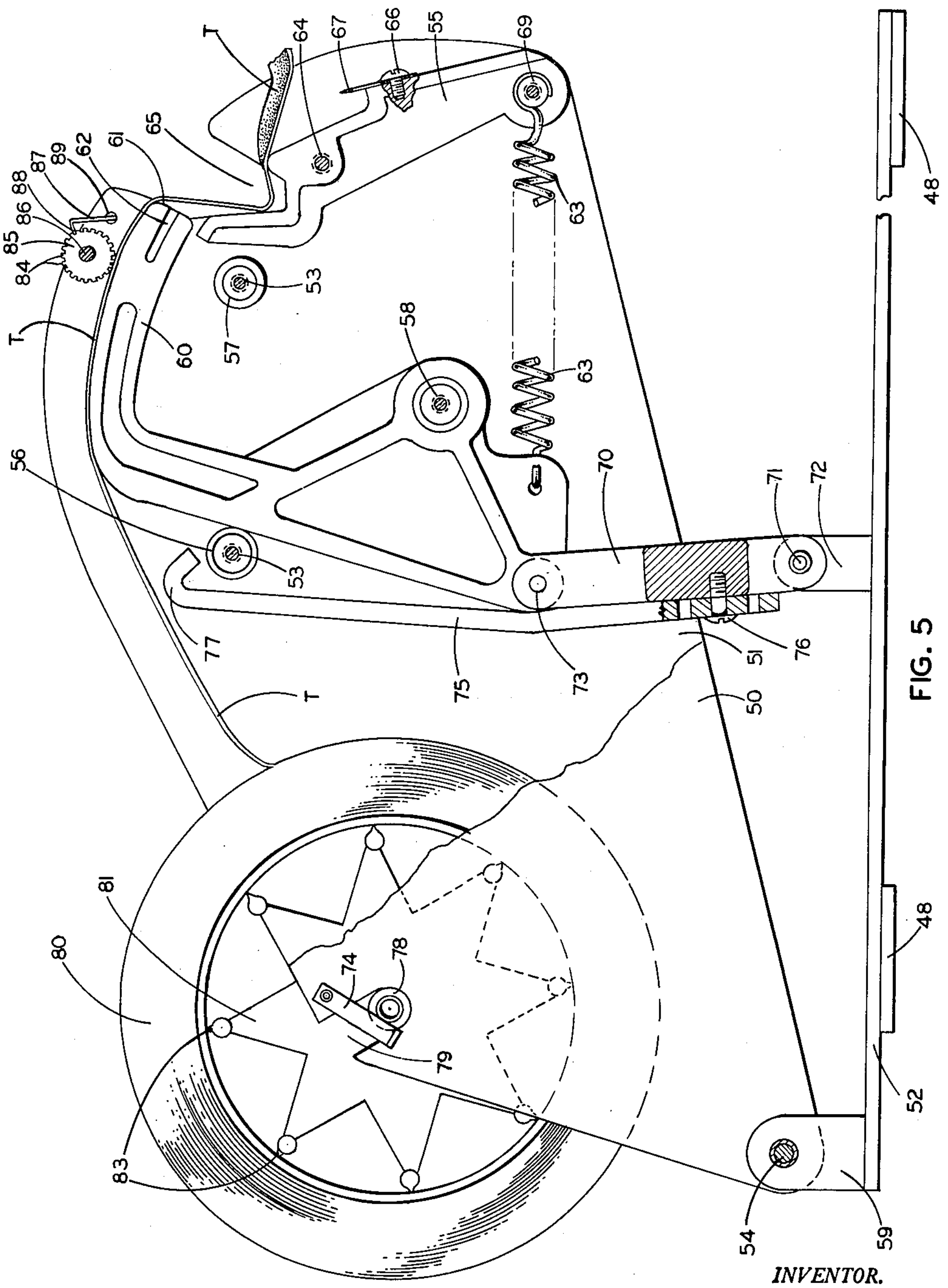
Figure 6:
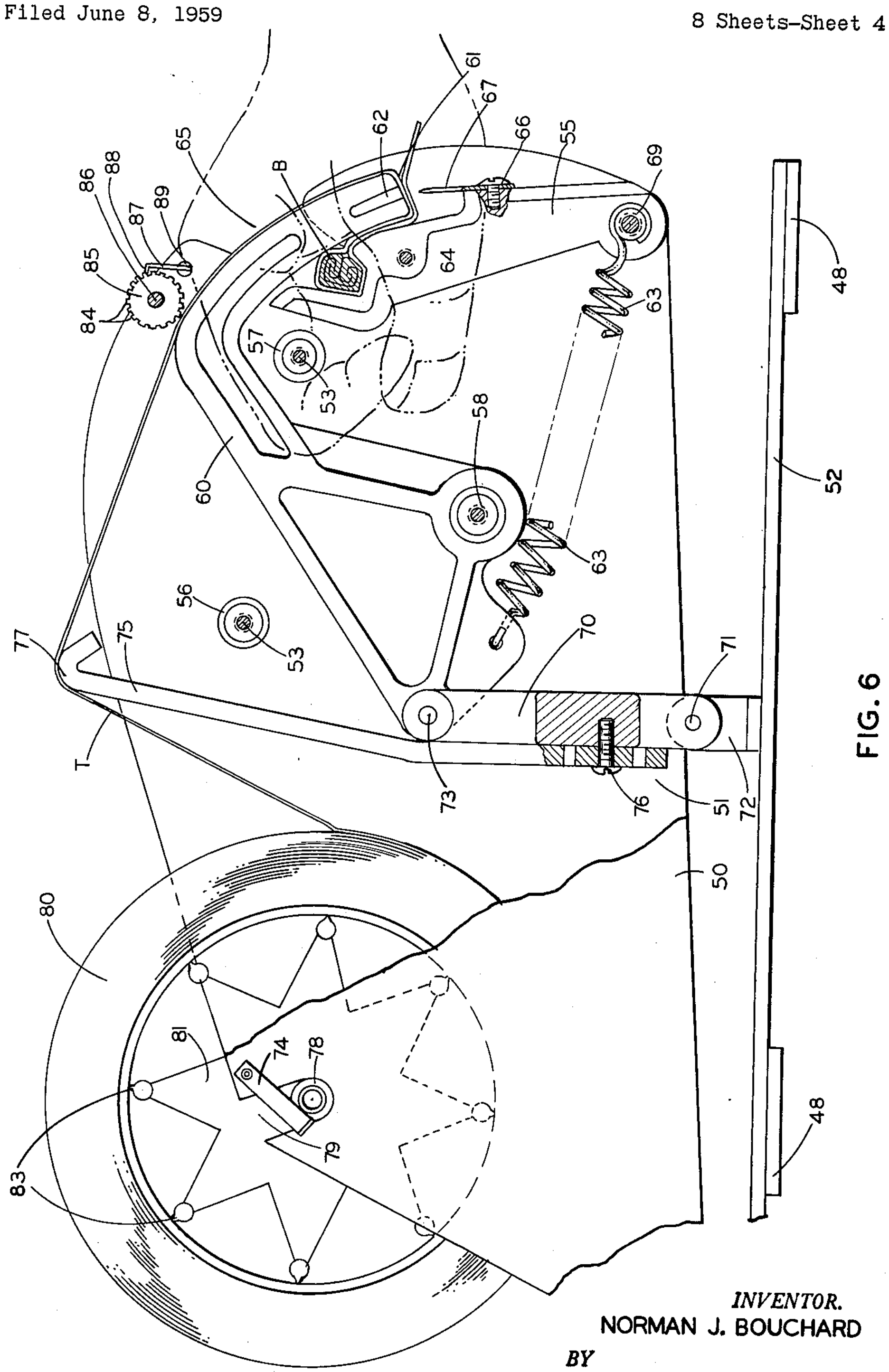

FIGURE 2 is a top view of the hands of an operator of a machine of this invention, holding the gathered neck of a bag which is ready to be inserted into and wrapped by a said machine, FIGURE 3 is a perspective view of the machine of FIGURE 1, in operating position, with the interior parts of the machine shown in dotted lines, FIGURE 4 is a top view of the hands of an operator of a machine of this invention, holding the neck of a bag which has been wrapped by said machine, FIGURE 5 is a side elevational view of a somewhat different embodiment of a machine of this invention with a roll of pressure-sensitive tape mounted therein, showing the machine in rest position, with part of one side of the machine broken away, for purpose of clarity, FIGURE 6 is a side elevational view of the machine of FIGURE 5, in operating position, showing the hands of the operator holding a bag being wrapped by the machine, with part of one side of the machine broken away, for purpose of clarity.

Figure 7:
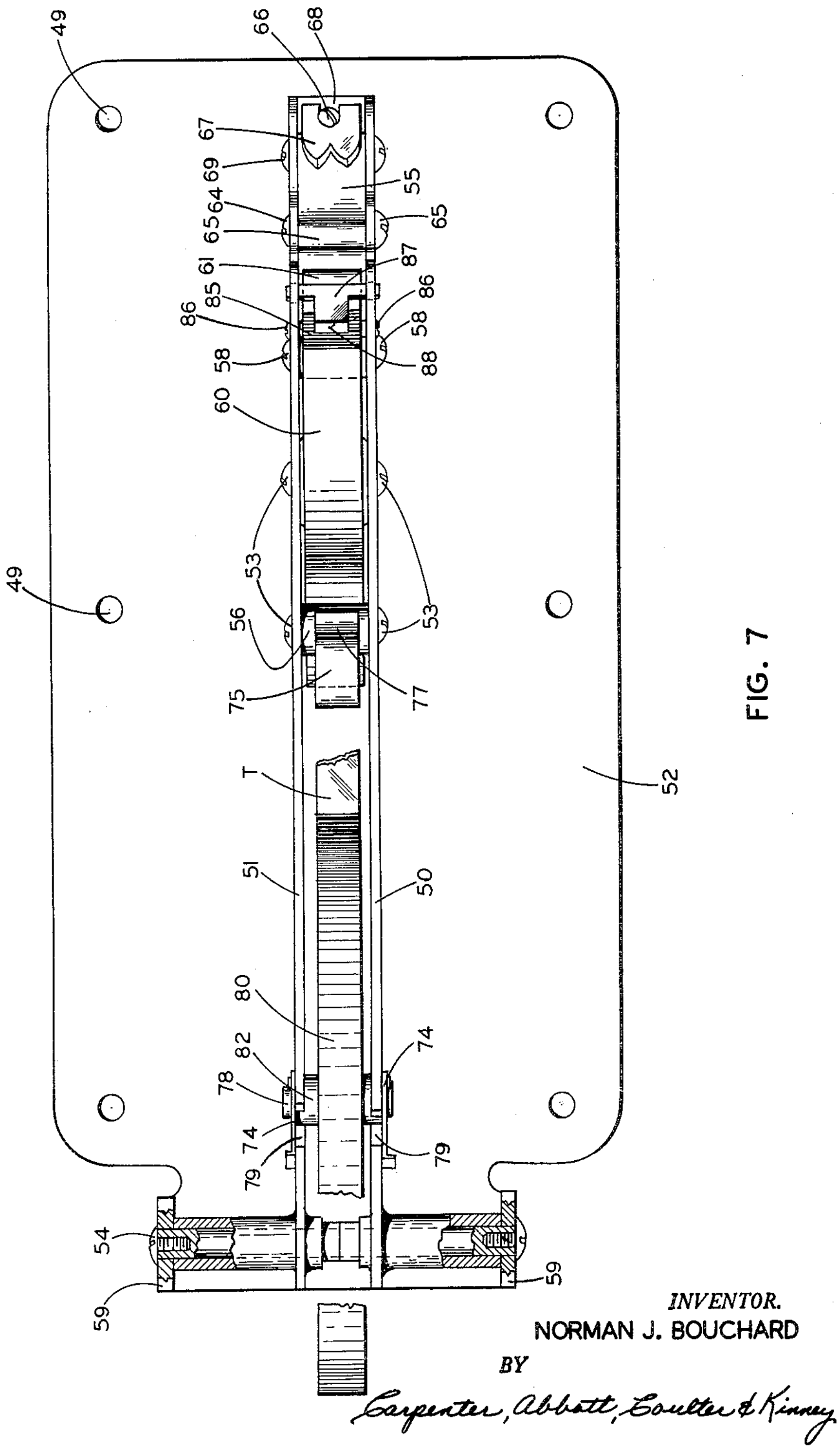
Figure 8:
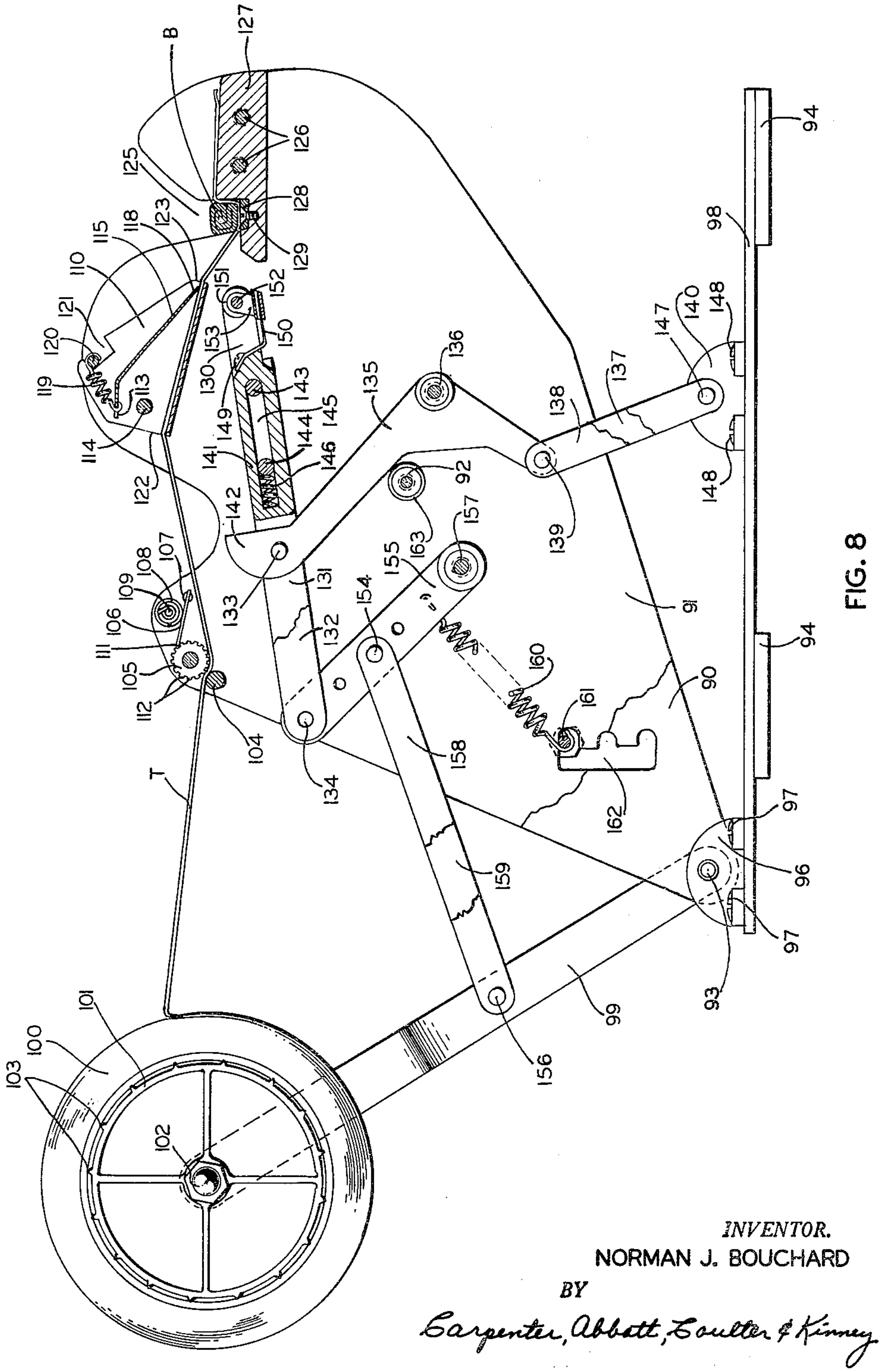
Figures 9, 10, 11:
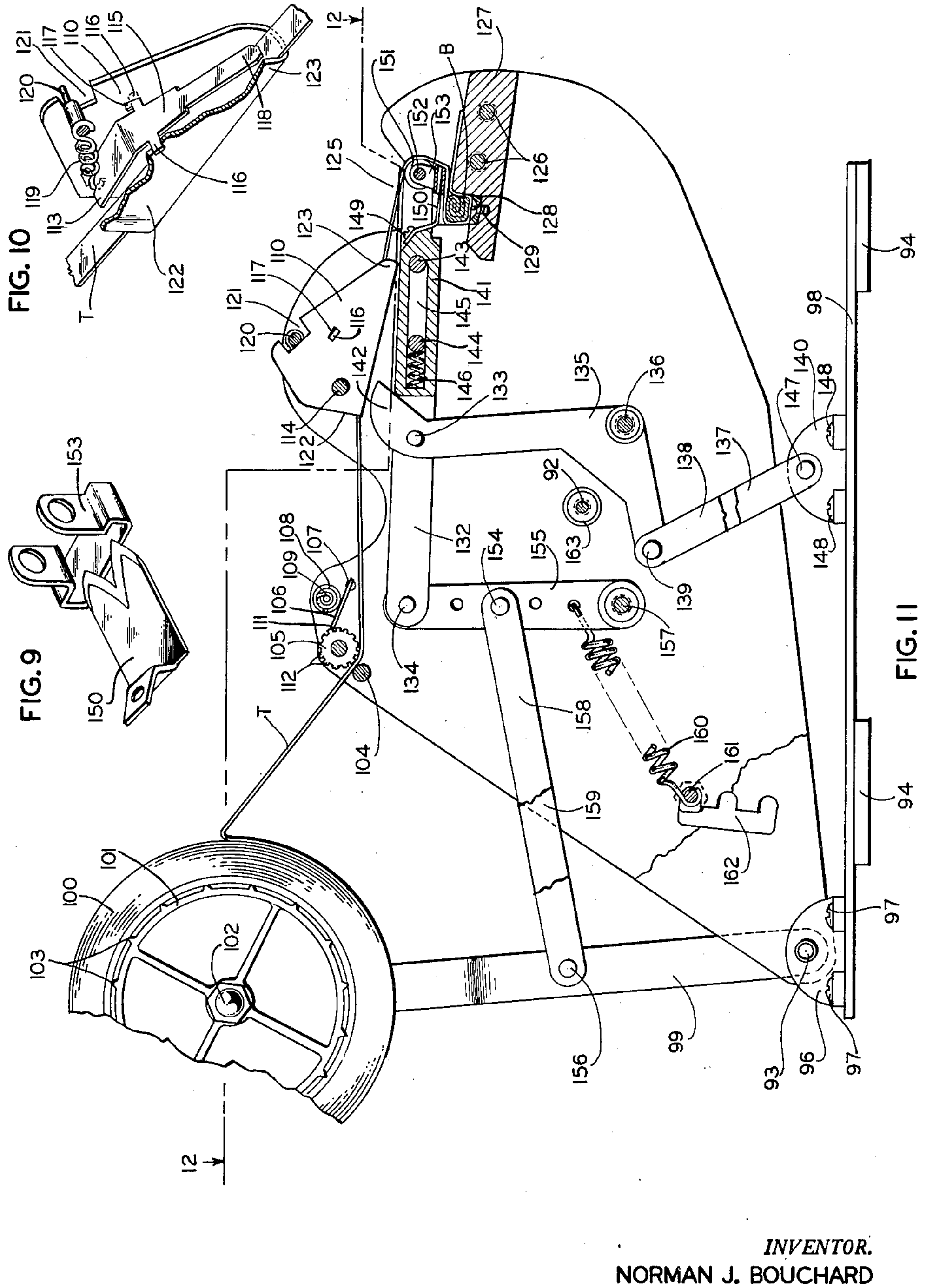
Figure 12:
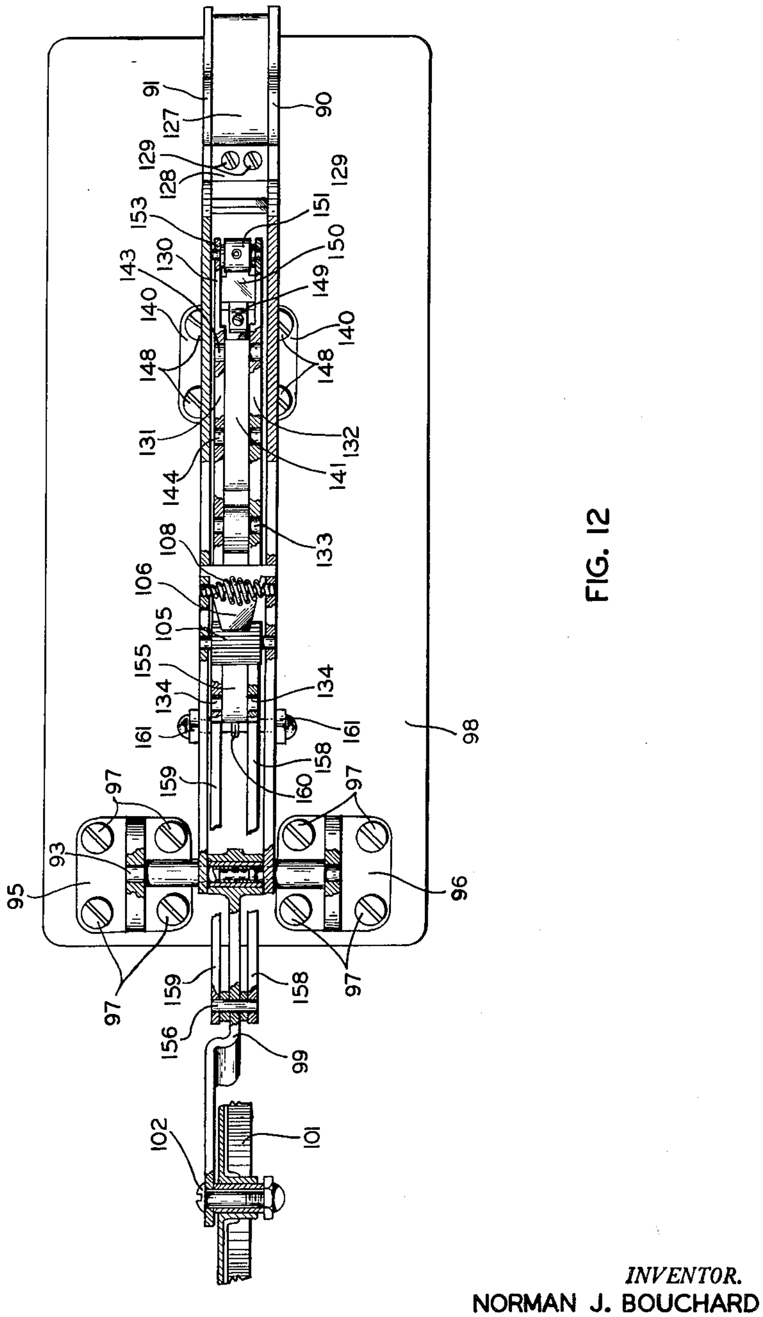

FIGURE 7 is a plan view of the machine of FIGURE 5, with the tape broken away or removed, for purpose of clarity, FIGURE 8 is a side elevational view of another different embodiment of a machine of this invention with a roll of pressure-sensitive tape mounted therein, showing the machine in rest position with the neck of a bag inserted therein, and with part of one side of the machine broken away, for purpose of clarity, FIGURE 9 is a detailed exploded view, in perspective showing the knife of the machine shown in FIGURE 8, and the bracket in which said knife is mounted, FIGURE 10 is a detailed perspective view of the slide channel contained in the machine shown in FIGURE 8, FIGURE 11 is a side elevational view of the machine of FIGURE 8, showing that machine in operating position with the neck of a bag inserted therein, and with part of one side of the machine broken away, for purpose of clarity, FIGURE 12 is a view taken along line 12—12 of FIGURE 11, with parts of the machine broken away, or shown in section, for the purpose of showing detailed construction.

Referring now to FIGURES 1 and 3, reference characters 20 and 21 designate generally parallel side members, which are formed with extending side members **20*a* and 21*a* attached to the exterior surface of said side members 20 and 21, and extending rearwardly therefrom. Side members 20 and 21 are held apart, in spaced relationship, by nose block 23, and together by bolts 19, which bolts 19 extend through side members 20 and 21 and nose block 23. Extending side members 20*a* and 21*a* are pivotally attached by pin 22 through base block 24, which block is attached to base 29. Tape roll 25 is mounted on hub 26 having journal opening 27, and said hub is rotatably suspended between extending side members 20*a* and 21*a* by pin 18, which is inserted through opening 27 and also through apertures 28 in each of the extending side members 20*a* and 21*a*. This mounting of hub 26 permits the free end of tape roll 25 to be drawn forwardly without displacement of said roll 25 from the machine. Hub 26 contains spokes 14, which spokes terminate in ridges 17 to engage the inner circumference of tape roll 25. Tape roll 25 is mounted in such manner that its adhesive coated surface will face upwardly as the tape T is unwound from roll 25** and drawn forwardly in the machine.

Each of the side members 20 and 21 is provided with slot tracks 36 and 37 formed in the opposing inner surfaces of said side members, and shuttle 30 is slidably held within said slot tracks 36 and 37. Each of the side members 20 and 21 is also provided with recess 35, which recess is formed at approximately right angles to tracks 36 and 37, and is open through the outer surfaces of side members 20 and 21. Nose block 23 provides a bottom surface for recess 35 and said nose block extends forwardly, between side members 20 and 21, to provide a surface between said side members, and to form the bottom surface of recess 40, which extends forward from recess 35. Knife block 43, containing knife 45, is attached to nose block 23 by screw 16, and said knife block 43 provides the forward surface of recess 40. Knife 45 is affixed horizontally, with its cutting edge facing toward recess 35, and is positioned so that it is about midway between the bottom and top of the tracks 36 and 37.

Shuttle 30 is pivotally attached by pin 31 to one end of arm 32, and the other end of arm 32 is pivotally attached to base 29 by pin 33. Spring 38 is attached to arm 32 and to base 29, and acts against arm 32 to hold shuttle 30 against stop 47. Stop 47 is attached to side extensions 20*a* and 21*a* through aperture 15 in said side extensions. Shuttle 30 is provided with horizontal slot 39 at its forward end 34, which slot 39 accommodates knife 45 when shuttle 30 is moved in tracks 36 and 37, across recess 35 into recess 40. Such movement of shuttle 30 occurs when the bag, or other object to which tape is to be applied, is thrust downwardly into recess 35.

Tension arm 41 is attached by bolts 42 to extending side members 20*a* and 21*a*. Springs 44 on bolts 42 bear upwardly against the heads on said bolts and downwardly against tension arm 41. Springs 44 act to urge tension arm 41 in the downward direction, forcing the tip 46 of tension arm 41 against the top of shuttle 30, to prevent the tape T (which lies, adhesive side up, between tip 46 and shuttle 30) from moving toward tape roll 25, as will be described more fully hereinafter.

In readying this machine for use, the leading end of tape T from roll 25 is passed forwardly between side extensions 20*a* and 21*a* and side members 20 and 21, along the top of shuttle 30, under the tip 46 of tension arm 41, and across recess 35 to the front of the machine. When it is desired to seal a bag, for example, the neck of the bag is gathered, as shown in FIGURE 2, and the operator then holds the bag at substantially right angles to the machine. The bag neck is then pressed into recess 35 against the adhesive surface of tape T. Said bag neck, thus being moved, will push the tape strip ahead of it, to the bottom of recess 35. Thus the free end of the tape will extend upwardly along the forward surface of recess 35, and the tape will extend around the underside of the bag neck and thence upwardly along the rear surface of said recess 35.

When the bag neck is pressed into contact with the bottom of recess 35, and the operator continues to apply downward pressure against the bag, side extensions 20*a* and 21*a*, and sides 20 and 21, will be caused to be pivoted on pin 22, and moved toward base 29. As shown in FIGURE 3, this movement will cause shuttle 30 to be moved forwardly, by action of arm 32 which pivots on pins 31 and 33. During this forward movement, the forward end 34 of shuttle 30 bears against the tape T which is held between the neck of the bag and tip 46 of tension arm 41. Thus, shuttle 30 moves in a straight line, in tracks 36 and 37, carrying tape T across recess 35, above the neck of the bag, toward recess 40. As the adhesive side of the tape T which is carried by shuttle 30 contacts, and adheres to, the adhesive side of the free end of the tape lying on the other side of the neck of the bag, a seal is formed around the neck of the bag. The tape is then severed by knife 45 as said knife moves into horizontal slot 39 as shuttle 30 continues to move into recess 40. The forward movement of shuttle 30 is stopped when forward end 34 of shuttle 30 bears against knife block 43.

The operator then releases the pressure against the bag, and spring 38, which was extended during the forward movement of shuttle 30, acts against arm 32 to return said shuttle 30 to its rest position against stop 47. The tape T is prevented from rearward movement, with shuttle 30, due to the downward pressure against said tape by tip 46 of tension arm 41. The tape T thus remains across recess 35, and when the sealed bag is withdrawn from recess 35 it is moved upward against the nonadhesive side of the tape. The tape is pushed upward by the withdrawal of the bag and falls back across recess 35 in position to contact another bag to be sealed. The sealed bag will appear as is shown in FIGURE 4.

The embodiment shown in FIGURES 5, 6 and 7 is somewhat different from the embodiment shown in FIGURES 1 and 3, although the machines are similar in operation. The embodiment shown in FIGURES 5, 6 and 7 contains generally parallel side members 50 and 51, which side members are held apart from each other in spaced relationship, and are held together by bolts 53 through stops 56 and 57, by bolts 64 and 69 through nose block 55 and bolt 58 through shuttle 60. Side members 50 and 51 are pivotally attached by bolt 54 to brackets 59, which brackets are attached to base member 52. Resilient members 48 are attached to the bottom surface of base 52 and apertures 49 are provided through base 52 to provide means for attaching said base to a table or such like.

Each of said side members 50 and 51 is provided with a recess 65, and nose block 55 is shaped to the form of said recess. Nose block 55 provides the rear, bottom and front surfaces for recess 65 between side members 50 and 51. Nose block 55 is attached to side members 50 and 51 by bolts 64 and 69. Knife 67 is attached to nose block 55 by screw 66, and said knife is formed with slot 68, so it may be raised or lowered to vary the timing of the cutting action.

Shuttle 60 is pivotally mounted on bolt 58, and said shuttle is curved toward its leading edge 61. Leading edge 61 of shuttle 60 contains horizontal slot 62. Arm 70 is pivotally attached at one end by pin 71 to bracket 72, which bracket is affixed to base 52. The other end of arm 70 is attached by pin 73 to shuttle 60. Spring 63 is attached to shuttle 60 and to bolt 69, and acts to urge shuttle 60 against stop 56. Stops 56 and 57 are attached to side members 50 and 51 by bolts 53. Finger member 75 is attached by screw 76 to arm 70 and extends upward and forward therefrom, forming knuckle 77 at the uppermost surface of said finger 75.

Each side member 50 and 51, at its trailing edge, is provided with slot 79. Tape roll 80, mounted on hub 81 having shaft 82 is rotatably suspended between side members 50 and 51 by lodgement of the projecting end portions 78 of shaft 82 into slots 79. Said slots are inclined to permit the tape T to be drawn forwardly from roll 80 without displacement of said roll 80 from the machine, and pivotable latches 74 aid in holding projecting end portions 78 in slots 79. Tape roll 80 is mounted in such manner that its adhesive coated surface will face upwardly as tape T is unwound from roll 80 and drawn forwardly in the machine. Hub 81 contains spokes with ridges 83 to engage the inner circumference of roll 80 more firmly.

Corrugated roller 85 is rotatably mounted between sides 50 and 51 on bolt 86, and is prevented from rotating in a clockwise direction (as the machine is viewed from the side shown in FIGURES 5 and 6), by metallic strip 87, keyed into apertures 89 in side members 50 and 51. Tip 88 of metallic strip 87 rides upon corrugations 84 in roller 85 when that roller moves in a counterclockwise direction. However, tip 88 is wedged between adjacent corrugations to prevent movement if said roller is urged in a clockwise direction.

In readying this machine for use, tape T, from roll 80 is passed forwardly, sticky side up, between side members 50 and 51 to and along the top of shuttle 60, under roller 85 and across recess 65. Referring now to FIGURE 6, to seal the neck of bag B, said bag is held at right angles to the machine and inserted into recess 65 and forced downwardly against the adhesive surface of the tape strip, to the bottom of said recess 65. The free end of the tape will project upward along the forward surface of recess 65, and the held end of the tape will extend upward along the rear surface of recess 65. Continued pressure against said bag will move sides 50 and 51 toward base 52, and this movement will cause shuttle 60 to be pivoted about bolt 58 by the action of arm 70 bearing upwardly against said shuttle, against pins 71 and 73. The pivotal movement of shuttle 60 moves the tape T, which lies between shuttle 60 and roller 85. This occurs as the leading edge 61 of shuttle 60 bears forwardly and downwardly against tape T, causing said tape to slide along the upper and leading edge surfaces of said shuttle as the shuttle is moved across recess 65, above the bag.

After the leading edge 61 of shuttle 60 has moved across recess 65, the adhesive side of tape T, carried by leading edge 61 of shuttle 60, is brought into contact with the adhesive side of the free end of tape which is held on the other side of the neck of bag B, and said adhesive surfaces adhere together, forming a seal around the bag. At about this stage of the wrapping operation, the back of the tape T contacts knuckle 77 on finger 75, and the forward movement of arm 70 moves finger 75, with knuckle 77, forwardly, toward the front of the machine, stripping tape from tape roll 80 during the continued movement of shuttle 60 and arm 70. Continued downward pressure on the article will cause shuttle 60 to continue its motion and to engage knife 67 into slot 62 in the leading edge 61 of shuttle 60, severing the tape. Shuttle 60 will then bear against stop 57, and the motion of the parts of the machine will be stopped.

The pressure on the bag is then released, and spring 63 acts to return shuttle 60 to its rest position against stop 56, raising sides 50 and 51 away from base 52. The tape is prevented from rearward movement with shuttle 60 by action of metallic strip 87 against roller 85, as described above. The wrapped bag is then removed from recess 65 and the tape T is in position, across recess 65, ready for the next article to be wrapped.

The machine shown in FIGURES 8, 11 and 12 is another slightly different embodiment of the present invention. The principal difference in this machine, from the previously described machines, is that the knife is carried on the shuttle, rather than affixed to the supporting structure of the machine. Also, certain other modifications have been made in order to obtain certain advantages from my novel principal for the operation of such machines.

Referring now to FIGURE 8, the embodiment shown will be seen to include generally parallel side members 90 and 91, which are held in upright position and together in spaced relationship by bolts 92, 136 and 157. Side members 90 and 91 are pivotally attached to bolt 93. Bolt 93 is attached through brackets 95 and 96, and said brackets are attached to base member 98 by screws 97. Base member 98 is supported by resilient members 94 which are attached to the bottom surface of base 98. Post 99 is also pivotally attached to bolt 93, and extends upwardly therefrom to support tape roll 100. Tape roll 100 is mounted on hub 101, and bolt 102 is inserted through hub 101 and post 99, rotatably attaching hub 101 to post 99. Hub 101 is provided with ridges 103 to engage the inner circumference of tape roll 100 more firmly. As shown in FIGURE 12, post 99 is bent to accommodate the periphery of tape roll 100, and said tape roll is mounted in such a manner that the adhesive coated surface of tape T will face upwardly and be aligned to pass between the sides 90 and 91 as the tape is unwound from the roll.

As the tape passes forwardly from the roll 100 it is threaded between rollers 104 and 105, which rollers are rotatably attached to side members 90 and 91. Roller 104 is a smooth surfaced roller, but the peripheral surface of roller 105 contains corrugations 112. Roller 105 is prevented from rotating in a clockwise direction (as the machine is viewed from the side shown in FIGURES 8 and 11 by metallic strip 106, keyed into apertures 107 in side members 90 and 91. Spring 108 is mounted in apertures 109 in sides 90 and 91 and bears downward against the top surface of strip 106, causing tip 111 of strip 106 to ride upon corrugations 112 in roller 105 when said roller is moved in a counter-clockwise direction. However, tip 111 is wedged between adjacent corrugations to prevent movement of roller 105 in a clockwise direction. The tape T is thus prevented from moving between the rollers 104 and 105, toward the tape roll 100.

After passing between rollers 104 and 105, tape T is threaded into slide channel 110 and the tape passes along the floor of said channel toward the front of the machine. Slide channel 110 is pivotally mounted between side members 90 and 91 by pin 114, which is attached to said side members. As shown in FIGURE 10, slide channel 110 contains retainer 115, and said retainer is pivotally mounted by extensions 116 which extend into slots 117 in the side of slide channel 110. The forward end 118 of retainer 115 is urged in the downward direction by spring 119. Spring 119 is attached to pin 120 and to the rearward end 113 of retainer 115. Pin 120 is attached to side members 90 and 91 and spring 119 acts to urge the rear 122 of slide channel 110 upwardly, and, at the same time, urges the front 123 of slide channel 110 downwardly, by action of the forward end 118 of retainer 115 against the bottom of said retainer. The pivotal movement of slide channel 110 is impeded by the edges of slots 121 in slide channel 110, which edges bear against pin 120. The forward end 118 of retainer 115 bears downwardly against the tape T to hold said tape along the bottom surface of slide channel 110.

Recess 125 is formed in the upper forward surface of side members 90 and 91, and receiving block 127 is attached by screws 126 to, and between, said side members 90 and 91. Receiving block 127 extends beneath recess 125, and adapter 128 is attached to receiving block 127 by screws 129. Adapter 128 can be removed, by removing screws 129, to increase the depth of recess 125, when articles of more bulk are to be wrapped. Tape T is threaded from slide channel 110 across recess 125, over adapter 128, and onto the upper surface of receiving block 127 when the machine is prepared for use.

Shuttle 130 is composed of spaced parallel shuttle bars 131 and 132, and is mounted between side members 90 and 91 on pins 133 and 134. Pin 133 is attached to shuttle bars 131 and 132 and to lever 135, which lever extends upwardly between shuttle bars 131 and 132 to form cam 142. Lever 135 is pivotally attached to sides 90 and 91 by bolt 136, and lever 135 is also pivotally attached to parallel arm members 137 and 138 by pin 139. Arm members 137 and 138 are pivotally attached at their other ends by pin 147 to bracket 140, which bracket is attached by screws 148 to base 98.

Slide 141 is retained on shuttle 130, between shuttle bars 131 and 132, by pins 143 and 144. As shown in FIGURES 8 and 12, pins 143 and 144 are attached to bars 131 and 132 through track 145 in slide 141, so slide 141 is movable along said pins, along said track 145. Spring 146 is inserted in track 145 so that it bears against the rear of said track and against pin 144. Spring 146 acts to urge slide 141 rearwardly, so that the front of track 145 rests against pin 143. Knife 150 is affixed to the forward end of slide 141 by screw 149. Roller 151 is retained between shuttle bars 131 and 132 by pin 152, and bracket 153 is suspended from pin 152, below roller 151. As shown in FIGURES 8 and 9, knife 150 is retained within bracket 153 and is moved through said bracket by movement of slide 141.

Link member 155 is pivotally attached between shuttle bars 131 and 132 by pin 134 at one end. The other end of said link member is pivotally attached to side members 90 and 91 by bolt 157. Parallel connecting bars 158 and 159 are pivotally attached, at their forward end, to link member 155 by pin 154, and said connecting bars are attached at their rearward end to post 99 by pin 156. Spring 160 is attached to link member 155 and adjustable pin 161. Pin 161 is attached to side members 90 and 91 through aperture 162. Pin 161 can be moved into any of the three positions in aperture 162, thereby adjusting the tension applied against spring 160. When the machine is in its rest position, as is shown in FIGURE 8, the action of spring 160 against link member 155 will cause shuttle 130 to be held rearwardly, until the rear surface of the upper part of lever 135 bears against stop 163, which stop is attached to, and between, side members 90 and 91 by bolt 92.

In the operation of this machine, with the tape T threaded as described above, the article to be taped, here the neck of a bag B as shown in FIGURES 8 and 11, is held by the operator at substantially right angles to the machine, and then pressed into recess 125 and downwardly against the adhesive side of the tape T. Thus, the free end of the tape will extend upwardly, against the front surface of recess 125, and the held portion of the tape will extend between the bag B and the forward end 123 of slide channel 110, as shown in FIGURE 8. Continued downward pressure against the article B will force the tape T and the article B against adapter 128, and sides 90 and 91 will move in downward pivotal movement, about bolt 93. The movement of sides 90 and 91 will cause the downward movement of bolts 136 and 157, and the action of arm members 137 and 138, against pin 139 and pin 147 causes lever 135 to pivot on bolt 136. The pivotal movement of lever 135 about bolt 136 moves the top of said lever in a clockwise direction, carrying pin 133, and the forward end of shuttle 130, in a slightly upward and forward direction. The movement of shuttle 130 carries pin 134 forwardly, causing link member 155 to pivot about bolt 157, against the action of spring 160, which action causes connecting bars 158 and 159 to move forwardly, pivoting post 99 in a clockwise direction about bolt 93.

As shuttle 130 is carried slightly upward and forward, roller 151 on pin 152 is forced against the tape T, and the tape is carried forwardly by roller 151 on said shuttle, stripping tape through slide channel 110 and rollers 104 and 105, as shuttle 130 moves across recess 125, above the bag B. As shown in FIGURE 11, during this movement of shuttle 130, the upper surface of said shuttle moves upwardly against the front 123 of slide channel 110, causing slide channel 110 to pivot on pin 114, and spring 119 acts to hold the front end 123 of slide channel 110 against the upper surface of shuttle 130. When the tape carried by shuttle 130 is transported beyond recess 125, the adhesive side of the tape carried by shuttle 130 contacts the adhesive side of the free end of the tape, and the adhesive surfaces of the tape adhere to each other. At this point in the wrapping operation, the action of lever 135 on pin 133 causes the forward end of shuttle 130 to move slightly downward and forward, toward receiving block 127. As shown in FIG. 11, after the tape surfaces have adhered, cam 142 on lever 135 begins to bear against the rear surface of slide 141, moving said slide forwardly, against the force of spring 146. The forward movement of slide 141 causes knife 150 to move forwardly in bracket 153. As slide 141 moves forward, knife 150 is moved outwardly through bracket 153 and against the tape carried over roller 151, severing said tape and forming a flag type wrap around the bag B.

Lever 135 pivots on bolt 136 until the rear surface of the lower part of said lever bears against stop 163, stopping the downward movement of sides 90 and 91. The operator then releases the downward pressure against the article and spring 160 acts to return the moving parts to their original rest positions.

The forward movement of post 99 has moved tape roll 100 in that direction, in order that it not be necessary to strip tape from said roll during the forward movement of shuttle 130. However, when post 99 is returned to its original position, the tape is stripped from the roll, since the tape which has passed between rollers 104 and 105 is prevented from moving toward tape roll 100 by action of metallic strip 106 against roller 105. Thus tape which was moved forwardly during the wrapping operation is retained in that forward position, and when the machine is returned to its rest position, tape will overlie recess 125 and receiving block 127, ready for the next article to be wrapped.

Variations in the operation of the above described embodiments undoubtedly suggest themselves, and various modifications of my machine, embodying some or all of the novel features herein disclosed, can be envisioned. Such variations are comprehended, and I do not intent to be limited only to the specific embodiments herein described, but, rather, I intend to be limited only by my disclosure taken as a whole, including the appended claims.

What I claim is:

1. In a machine for wrapping articles with adhesive tape, a supporting structure including a recess adapted to receive an article to be wrapped, a reciprocable shuttle mounted for movement across said recess and back, means for actuating said shuttle across said recess and over said article for transporting adhesive tape to be applied to said article, and means for returning said shuttle back across said recess.

2. In a machine for wrapping an article with adhesive tape, wrapping means comprising a supporting structure including a recess for holding said article against the adhesive surface of said tape, reciprocable shuttle means mounted for movement across said recess and back, said shuttle means upon actuation transporting a supply of tape across said recess and over said article, means for returning said shuttle means back across said recess to its initial position and means for severing said tape after it has been transported over said article.

3. A machine for wrapping articles with adhesive tape, said machine comprising a supporting structure pivotally attached to a base member, said supporting structure including a recess adapted to receive a length of tape from a supply thereof and then to hold an article to be wrapped, means for transporting additional tape across said recess, over said article, means for severing said tape after it has been transported over said article, and means for urging said supporting structure away from said base member; said transporting means comprising a shuttle reciprocally movable across said recess, said severing means comprising a slot and a knife blade, said knife blade being engageable into said slot during the movement of said shuttle, said urging means comprising a spring, linkage being provided whereby movement of said supporting structure in relation to said base member will cause movement of said shuttle.

4. A machine for wrapping articles with adhesive tape, said machine comprising a supporting structure pivotally attached to a base member, said supporting structure including a recess for holding an article to be wrapped, said recess being adapted to receive a length of tape from a supply thereof and then to receive an article to be wrapped, means for transporting an additional length of tape, from said supply, across said recess, over said article, means for severing said tape after it has been transported over said article, means for urging said supporting structure away from said base member, means for stripping adhesive tape from a supply thereof, and means for preventing the movement of said tape toward said supply during the operation of said machine; said transporting means comprising a shuttle against which a length of tape is held, said shuttle being pivotally attached to said supporting structure, whereby said shuttle will move across said recess when said supporting structure is caused to move, said severing means comprising a slot and a knife blade, said knife blade being engageable into said slot during the movement of said shuttle, said urging means comprising a spring, said preventing means including an element attached to said machine in position to bear against said tape to prevent movement thereof as said supporting structure is caused to move away from said base member.

5. A machine for wrapping articles with adhesive tape, said machine comprising a supporting structure pivotally attached to a base member, said supporting structure including a recess for holding an article over and in contact with the adhesive surface of said tape, means for transporting adhesive tape across said recess, over said article, means for severing said tape after it has been transported over said article, means for urging said supporting structure away from said base member, means for stripping adhesive tape from a supply thereof, means for preventing the movement of said tape toward said supply during the operation of said machine, and means for guiding said tape against said transporting means; said transporting means comprising a movable shuttle pivotally linked to said supporting structure; said severing means comprising a knife-bearing slidable member attached to said shuttle; said urging means comprising a spring; said stripping means including a post attached to said supporting structure, linkage being provided between said post and said supporting structure whereby movement of said supporting structure will cause tape-stripping movement of said post.

References Cited in the file of this patent

UNITED STATES PATENTS

| | | |
|---|---|---|
| 2,741,885 | Allison | Apr. 17, 1956 |
| 2,787,102 | Kreuger | Apr. 2, 1957 |
| 2,841,935 | Kreuger | July 8, 1958 |
| 2,882,663 | Leighton | Apr. 21, 1959 |
| 2,916,863 | Leighton | Dec. 15, 1959 |